(12) United States Patent
You et al.

(10) Patent No.: US 6,504,596 B1
(45) Date of Patent: Jan. 7, 2003

(54) LIQUID CRYSTAL DISPLAY DEVICE

(75) Inventors: Myung Ho You, Kyungsangbuk-do (KR); Dong Yeung Kwak, Kyungsangbuk-do (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/525,460

(22) Filed: Mar. 15, 2000

(30) Foreign Application Priority Data

Mar. 16, 1999 (KR) .............................................. 99-8838

(51) Int. Cl.[7] .................................................. G02F 1/13
(52) U.S. Cl. .......................... 349/187; 349/58; 349/158
(58) Field of Search ............................ 349/58, 158, 187

(56) References Cited

FOREIGN PATENT DOCUMENTS

JP          08-338972        * 12/1996

* cited by examiner

*Primary Examiner*—Kenneth Parker
*Assistant Examiner*—David Chung
(74) *Attorney, Agent, or Firm*—Birch, Stewart, Kolasch & Birch, LLP

(57) ABSTRACT

A liquid crystal display device that is capable of improving an anti-impact and anti-corrosion. In the device, corner cutting keys are provided to cut the corners of a liquid crystal panel. Also, verniers are provided to grind the corner of the liquid crystal panel.

9 Claims, 4 Drawing Sheets

LIQUID CRYSTAL DISPLAY DEVICE

BACKGROUND OF THE INVENTION

1. Field of the Invention

This invention relates to a liquid crystal display and more particularly to a liquid crystal display that is adapted for improving an anti-impact (or impact-resistance) and an anti-corrosion (or corrosion-resistance).

2. Description of the Related Art

Generally, a liquid crystal display (LCD) is trending toward gradually wider applications because of its characteristics such as light weight, thin thickness and low power driving, etc. Recently, a LCD has been applied to a display device for an instrument indicating the progress direction and the altitude, etc. of an aircraft as well as a display device for military equipment or car navigation requiring a high reliability. Accordingly, the LCD must satisfy the requirements of this equipment. For, instance it is necessary for the LCD to have an anti-impact property capable of withstanding a vibration and an impact generated upon take off and landing of the aircraft as well as an anti-corrosion capable of withstanding a severe environment such as a high temperature, a high wetness and a high pressure.

The conventional liquid crystal panel includes liquid crystal cells arranged, in a matrix type, between two glass substrates, and switch devices for switching signals applied to the liquid cells. In the liquid crystal panel, as shown in FIG. 1, a pad area is provided with ON/OFF pads 8 for testing whether or not a thin film transistor (TFT) used as a switch device is poor. Also, the pad area is provided with a gate pad 14 for delivering a scanning signal applied from a gate driving circuit (not shown) into the liquid crystal panel, and a data pad for delivering an image signal applied from a data driving circuit (not shown) to the liquid crystal panel. Since a lower substrate 2 and an upper substrate 4 are made from glass, they make a structure weak to an impact. Particularly, in the fabrication process, the liquid crystal panel is scribed to a desired size. A minute crack is generated in the liquid crystal panel in the course of this scribing process. In this case, since a crack generated at four sides of the liquid crystal panel can be removed in a process of grinding each side of the liquid crystal panel, but a crack generated at the corners thereof is more enlarged due to a vibration or an impact from the exterior to damage the corners, the liquid crystal panel has a problem of weak anti-impact.

A portion of a single metal layer 10 contained in the liquid crystal panel is exposed to an environment of high temperature, high pressure and high wetness from the exterior thereof due to a crack formed at the corners to thereby be separated and detached from the lower substrate. This phenomenon is often referred to as "corrosive detachment".

A sealing ability of the sealant adhered to a seal pattern 6 is deteriorated due to such a detachment of the single metal layer. This causes a problem in that a liquid crystal oriented at the interior of the seal pattern 6 is leaked to the exterior thereof. As a result, a novel liquid crystal panel for improving an anti-impact and anti-corrosion is keenly required.

SUMMARY OF THE INVENTION

Accordingly, it is an object of the present invention to provide a liquid crystal display device that is capable of improving an anti-impact and anti-corrosion.

In order to achieve these and other objects of the invention, a liquid crystal display device according to one aspect of the present invention includes a corner cutting key for cutting the corner of a liquid crystal panel.

A liquid crystal display device according to one aspect of the present invention includes a plurality of verniers for grinding the corners of a liquid crystal panel.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
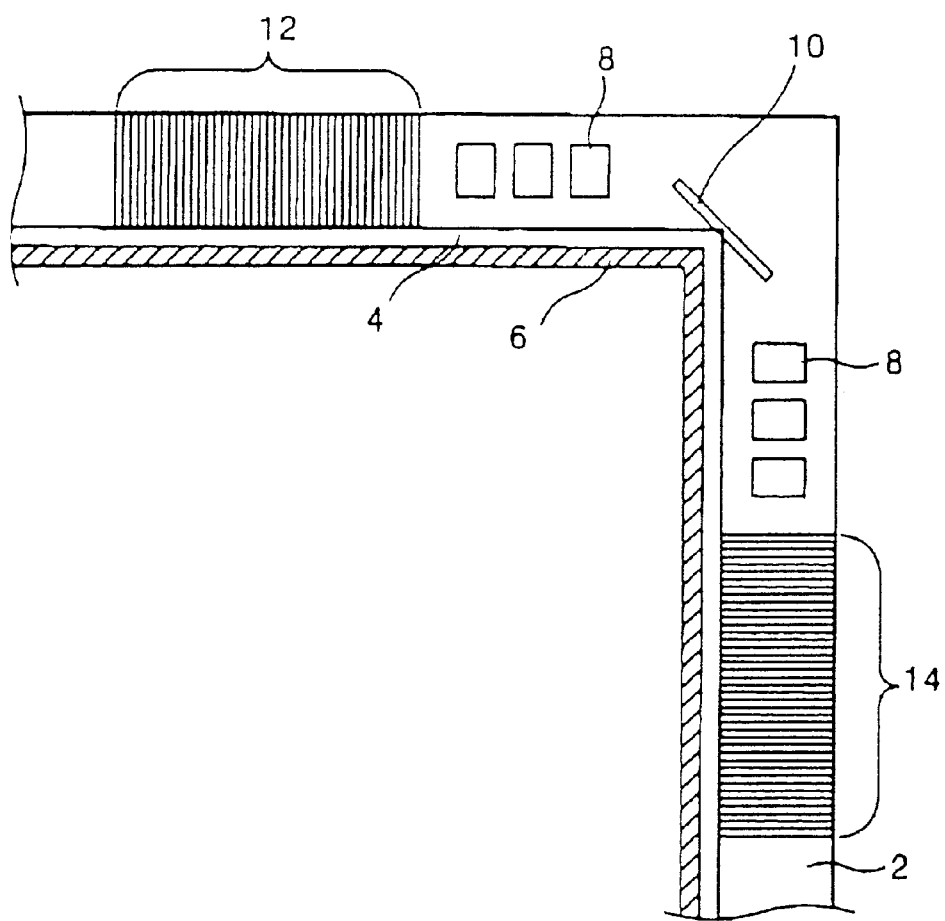
FIG. 1 is a plan view showing the structure of the conventional liquid crystal panel.
Figure 2:
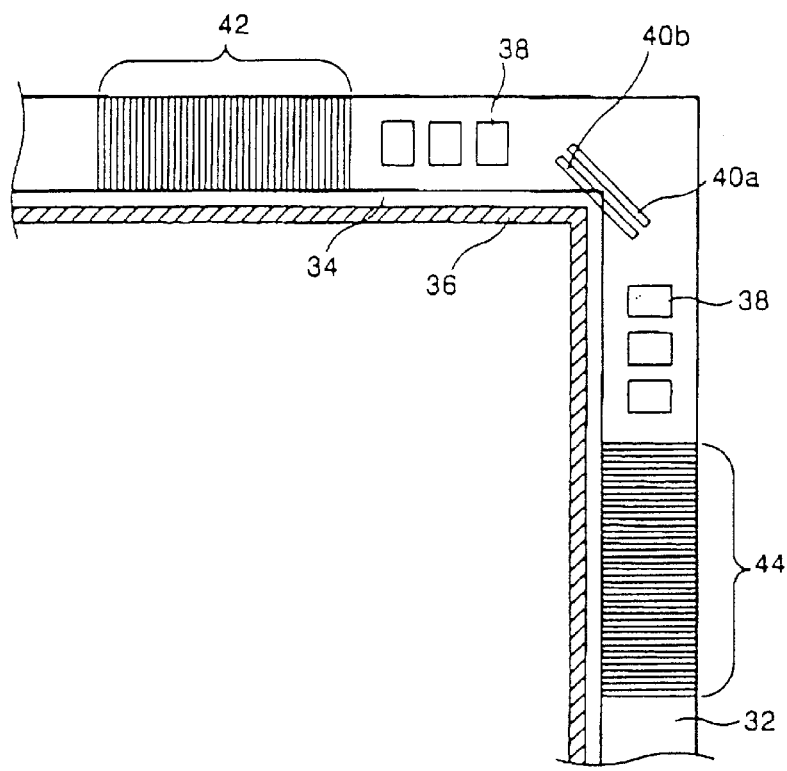
FIG. 2 is a plan view showing the structure of a liquid crystal panel according to an embodiment of the present invention.
Figure 3:
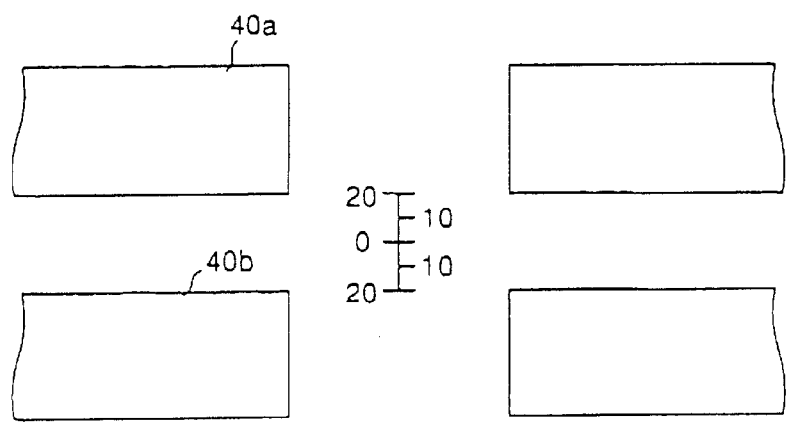
FIG. 3 is a detailed view of a corner cutting key in FIG. 2.
Figure 4:
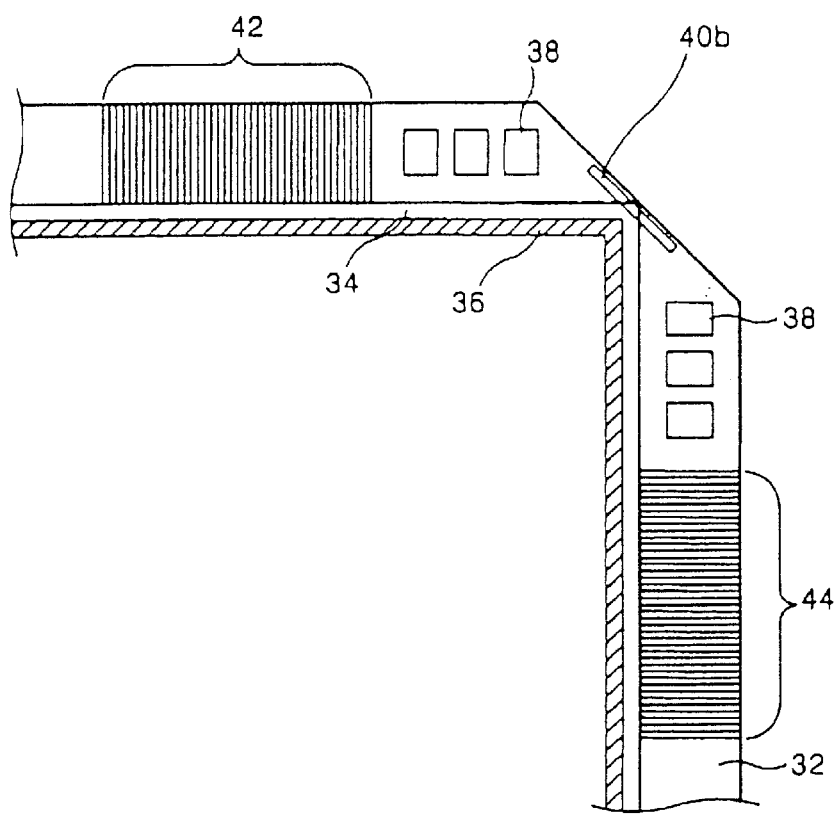
FIG. 4 is a plan view showing the structure of the liquid crystal panel after cutting the corners in FIG. 2.
Figure 7:
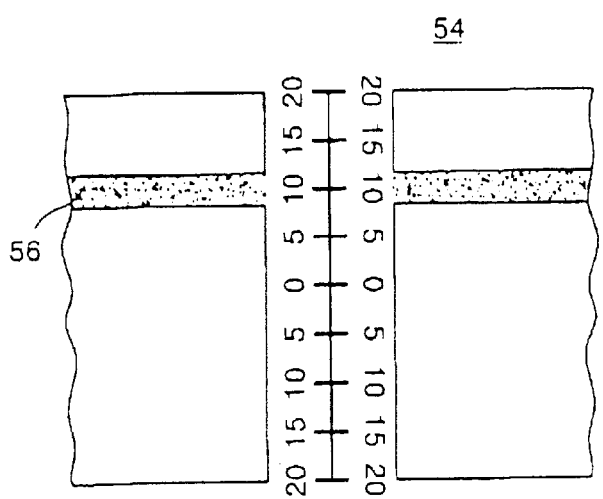
FIG. 7 is an enlarged view of the vernier in FIG. 6.

Referring to FIG. 7, there is shown a liquid crystal display device according to an embodiment of the present invention. The liquid crystal display device includes corner cutting keys 40 for cutting the corner of a liquid crystal panel. In order to improve an anti-corrosion of the liquid crystal panel, first and second corner cutting keys 40a and 40b are successively and adjacently arranged at the corner of the liquid crystal panel. Since a data pad 42, a gate pad 44, an ON/OFF pad 32 and a seal pattern 36 have the same function and operation as those shown in FIG. 1, a detailed explanation as to them will be omitted. The first and second corner cutting keys 40a and 40b arranged successively and adjacently are illustrated in detail in FIG. 3. A boundary position with a desired distance (e.g., 0.2 mm) from the lower end of the first corner cutting key 40a is connected to a boundary position with a desired distance (e.g., 0.2 mm) from the upper end of the second corner cutting key 40b. At this time, a desired distance (e.g., 0.4 mm) exists between the first and second corner cutting keys 40a and 40b. In order to prevent a corrosive detachment of the corner cutting keys 40, the liquid crystal panel is cut such that the corner cutting keys 40 after the cutting are located at the interior of the liquid crystal panel as shown in FIG. 4. In other words, the liquid crystal panel improves an anti-impact and an anti-corrosion by cutting the first and second corner cutting keys 40a and 40b in such a manner that the corner cutting keys are located at the interior of the liquid crystal panel.

Figure 5:
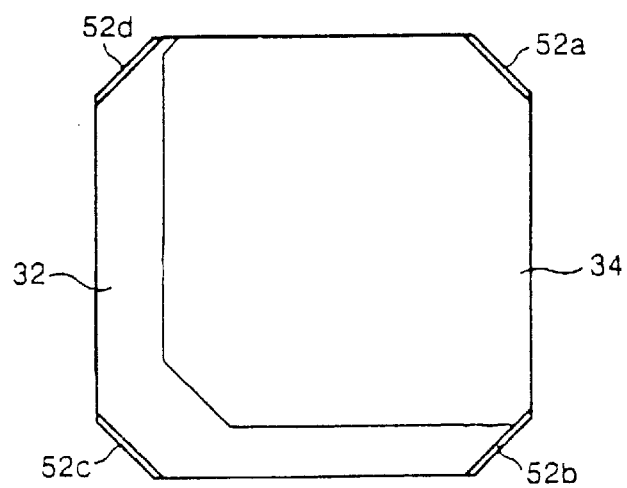
FIG. 5 is a plan view showing the structure of a liquid crystal panel according to another embodiment of the present invention.
Figure 6:
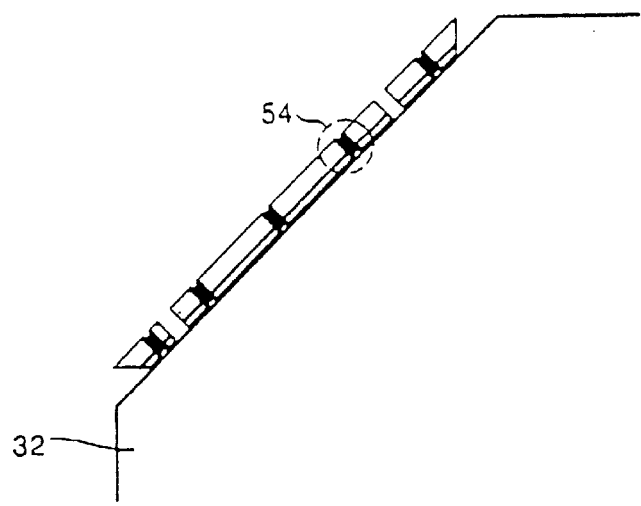
FIG. 6 is a detailed view of the corner in FIG. 5.

Referring now to FIG. 5, there is shown a liquid crystal display device according to another embodiment of the present invention. The liquid crystal display device includes a vernier 54 for grinding the corners of a liquid crystal panel. In order to improve an anti-impact of the corner, rectangular portions of the corners are ground at a desired angle (e.g., 45°). Thus, first to fourth chamfers 52a to 52d are formed at the corners as shown in FIG. 5, thereby improving an anti-impact of the liquid crystal panel. Each chamfer 52 is provided with a plurality of verniers 54 as shown in FIG. 6.

A metal pattern provided with a notch mark on a scale with a constant interval is formed at the vernier 54 as shown in FIG. 7, thereby improving an accuracy of the grinding work. A guide line 56 are provided at the vernier 54, so that, when the grinding is carried out based on the guide line 56, a design of a minimum margin is possible and therefore a process time can be shortened.

As described above, a liquid crystal display device according to the present invention has the corner cutting keys arranged to cut the corners of the liquid crystal panel and the verniers formed to grind the corners, so that it has an advantage in that impact resistance and corrosion resistance of the liquid crystal panel can be improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. For instance, it should be understood that the present liquid crystal display device is widely applicable to display devices for military equipment and car navigation and other various display devices besides a display device for aircraft. Accordingly, the scope of the invention shall be determined only by the appended claims and their equivalents.

What is claimed is:

1. A liquid crystal display device, which comprises:

liquid crystal cells arranged in a matrix between two glass substrates to form a liquid crystal panel;

switch devices for switching signals applied to the liquid crystal cells; and corner cutting keys on the liquid crystal panel to guide a cutting a corner of the liquid crystal panel.

2. The liquid crystal display device according to claim 1, wherein the corner cutting keys comprise a first corner cutting key and a second corner cutting key, and the first and second corner cutting keys are arranged at the corner such that the first corner cutting key and the second corner cutting key each have at least one adjacent boundary line.

3. The liquid crystal display device according to claim 1, wherein the corner cutting keys are mounted at a position in the liquid crystal panel interior to a portion of the corner to be cut.

4. A liquid crystal display device, which comprises:

liquid crystal cells arranged in a matrix between two glass substrates to form a liquid crystal panel;

switch devices for switching signals applied to the liquid crystal cells; and a plurality of verniers on the liquid crystal panel to guide grinding corners of the liquid crystal panel.

5. The liquid crystal display device according to claim 4, wherein the corners are ground based on guide lines provided at the verniers.

6. The liquid crystal display device according to claim 2, wherein a lower end of the first corner cutting key is about 0.2 mm from an upper end of the second corner cutting key.

7. The liquid crystal display device according to claim 2, wherein a lower end of the first corner cutting key is about 0.4 mm from an upper end of the second corner cutting key.

8. The liquid crystal display device according to claim 4, wherein chamfers are formed at the corner, wherein the anti-impact property of the liquid crystal panel is improved.

9. The liquid crystal display device according to claim 4, wherein a notch on a scale with a constant interval is formed at the vernier.

* * * * *